(12) United States Patent
You (10) Patent No.: US 12,320,105 B2
(45) Date of Patent: Jun. 3, 2025

(54) SHOWER HEAD AND RECEPTACLE COMBINATION DEVICE WITH OUTLET WATER FILTERING FUNCTION (71) Applicant: Junjie You, Xiamen (CN)

(72) Inventor: Junjie You, Xiamen (CN)

( * ) Notice: Subject to any disclaimer, the term of this patent is extended or adjusted under 35 U.S.C. 154(b) by 519 days.

(21) Appl. No.: 17/859,131

(22) Filed: Jul. 7, 2022

(65) Prior Publication Data

US 2022/0341137 A1    Oct. 27, 2022

(30) Foreign Application Priority Data

Jun. 8, 2022 (CN) .......................... 202210639152.0

(51) Int. Cl.
| | | |
|---|---|---|
| E03C 1/04 | (2006.01) | |
| B01D 35/04 | (2006.01) | |
| B01D 35/157 | (2006.01) | |
| B05B 15/62 | (2018.01) | |
| E03C 1/02 | (2006.01) | |

(52) U.S. Cl.
CPC ............ *E03C 1/0408* (2013.01); *B01D 35/04* (2013.01); *B01D 35/1573* (2013.01); *B05B 15/62* (2018.02); *B01D 2201/162* (2013.01); *E03C 2001/026* (2013.01); *E03C 2201/40* (2013.01)

(58) Field of Classification Search
CPC ............ E03C 1/0408; E03C 2001/026; E03C 2201/40; B05B 15/62; B01D 35/04; B01D 35/1573; B01D 2201/162

USPC ........................................................ 239/282
See application file for complete search history.

(56) References Cited

U.S. PATENT DOCUMENTS

| | | | | |
|---|---|---|---|---|
| 5,518,181 | A   * | 5/1996 | Shames ................. | B05B 1/1609 |
| | | | | 239/446 |
| 2002/0070293 | A1* | 6/2002 | Ti ............................ | B05B 15/40 |
| | | | | 239/553 |
| 2009/0007330 | A1* | 1/2009 | Genord ..................... | B05B 1/18 |
| | | | | 4/695 |
| 2011/0147286 | A1* | 6/2011 | Mang ...................... | E03C 1/066 |
| | | | | 210/236 |
| 2013/0161420 | A1* | 6/2013 | Tseng ........................ | E03C 1/06 |
| | | | | 239/581.1 |
| 2018/0193851 | A1* | 7/2018 | L'Henaff .................. | B05B 1/18 |
| 2020/0270146 | A1* | 8/2020 | Farley ....................... | B05B 1/18 |
| 2021/0178409 | A1* | 6/2021 | Hofman ................ | E03C 1/0408 |

* cited by examiner

*Primary Examiner* — Joseph A Greenlund
*Assistant Examiner* — Kevin Edward Schwartz (57) ABSTRACT Disclosed is a shower head and receptacle combination device with an outlet water filtering function, wherein by arranging a filter valve shell arranged in a device shell and mounting a filter element and a switching valve element in the filter valve shell, water flow can be filtered, and then filtered water is sprayed from a handheld shower head and/or an overhead shower head for a user to take a shower. The shower head and receptacle combination device has the advantages of good filtering effect, high water outlet pressure, small size and low cost.

8 Claims, 9 Drawing Sheets

SHOWER HEAD AND RECEPTACLE COMBINATION DEVICE WITH OUTLET WATER FILTERING FUNCTION

CROSS-REFERENCE TO RELATED APPLICATIONS

This application claims the benefit of priority from Chinese Patent Application No. 202210639152.0, filed on Jun. 8, 2022. The content of the aforementioned application, including any intervening amendments thereto, is incorporated herein by reference in its entirety.

FIELD

The present disclosure relates to the technical field of shower equipment, in particular to a shower head and receptacle combination device with an outlet water filtering function.

BACKGROUND

It is well known that shower equipment includes a handheld shower head and an overhead shower head, when the shower equipment is used, a user can use the handheld shower head to wash the body at will and use the overhead shower head to shower the body, so that the shower equipment has the advantages of being convenient to use and comfortable. Moreover, with the improvement of the quality of life of people, the requirements of people on shower health, especially on the quality of water for showering, are getting higher and higher.

However, filtering cotton is usually arranged in a water outlet disc of a handheld shower head and an overhead shower head in existing shower equipment for filtering out large-particle impurities to prevent water outlets of the handheld shower head and the overhead shower head from being clogged, not only is the filtering effect poor, but also the water outlet pressure may be greatly reduced; there is also shower equipment that filters water by additionally arranging an independent water purifier so as to ensure the filtering effect, but the defects of large size and high cost are caused.

In view of this, the inventor develops and designs the present disclosure through deep conception and positive research, improvement and trial for many defects and inconveniences caused by imperfection of the structural design of the shower equipment.

SUMMARY

The present disclosure aims to provide a shower head and receptacle combination device with an outlet water filtering function, which is good in filtering effect, large in water outlet pressure, small in size and low in cost.

In order to achieve the above purpose, the solution of the present disclosure is as follows:

a shower head and receptacle combination device with an outlet water filtering function is disclosed. The shower head and receptacle combination device includes a device shell;

a filter valve shell, mounted in the device shell, wherein a filter chamber and a valve element chamber are arranged in the filter valve shell, a water inlet extending out of the device shell is formed in the side wall of the filter chamber, and a first water outlet and a second water outlet are formed in the side wall of the valve element chamber;

a filter element, cooperatively arranged in the filter chamber, wherein the end of the filter element facing the valve element chamber is hermetically connected with the valve element chamber, and a first water passing hole communicating with the valve element chamber is formed in the filter element;

a switching valve element, cooperatively arranged in the valve element chamber for opening or closing the first water outlet and the second water outlet;

a shower head connector, fixed to the bottom of the filter valve shell, wherein one end of the shower head connector extends out of the device shell, and the other end of the shower head connector communicates with the first water outlet;

an overhead shower head, mounted in the device shell, wherein one end of the overhead shower head is hermetically connected with the second water outlet, and the other end of the overhead shower head are provided with nozzles extending out of the device shell;

a valve element handle, cooperatively arranged outside the device shell, wherein one end of the valve element handle penetrates through the device shell and then is connected with the switching valve element so as to control the switching valve element; and a handheld shower head and a shower head connecting pipe, wherein the device shell is provided with a shower head containing groove, and the handheld shower head is contained in the shower head containing groove and connected with the shower head connector through the shower head connecting pipe.

Preferably, the filter element is a composite filter element formed by integrating one or more of a PP cotton filter element, an activated carbon filter element and a VC filter element.

Preferably, the shower head and receptacle combination device is further provided with a filter element cover, a cover through hole is formed in the side wall of the device shell, the filter element passes through the cover through hole and then is detachably mounted in the filter chamber, and one end of the filter element cover passes through the cover through hole and then is hermetically screwed on one end of the filter valve shell.

Preferably, the overhead shower head is detachably mounted in the device shell, and the nozzles in the overhead shower head are sheet-shaped water nozzles, columnar water nozzles, straight flushing water nozzles, pulse-like water nozzles or mist water nozzles.

Preferably, an arc-shaped guide groove is arranged on the end face of the filter valve shell facing the valve element handle, and three positioning grooves are arranged on the guide groove at equal intervals; a counterbore is formed in the end of the valve element handle facing the filter valve shell, a first spring and a positioning pin are mounted in the counterbore, one end of the positioning pin presses the first spring into the counterbore, and the other end of the positioning pin abuts against the interior of the guide groove; when the valve element handle rotates the switching valve element, the positioning pin moves along the guide groove and is movably inserted into one of the positioning grooves.

Preferably, the switching valve element includes a valve element body, rotationally and cooperatively arranged in the valve element chamber, wherein one end of the valve element body is provided with a second water passing hole, the second water passing hole communicates with the first water passing hole, the middle of the valve element body is provided with a mounting cavity and a water passing groove communicating with the second water passing hole, and the other end of the valve element body is connected with the valve element handle; and a second spring and a water stop block, wherein one end of the water stop block presses the second spring into the mounting cavity, and the other end of the water stop block is in sealed contact with the first water outlet and the second water outlet.

Preferably, the shower head and receptacle combination device further includes a ball head connecting assembly, wherein the ball head connecting assembly includes a ball head nut, a sealing gasket, a water stop gasket, a clamping ring and a locking nut, the sealing gasket is cooperatively arranged between the water inlet and the ball head nut, the water stop gasket and the clamping ring sleeve the ball head nut, and the locking nut sleeves the water stop gasket and is screwed on the water inlet so as to lock the ball head nut, the sealing gasket, the water stop gasket and the clamping ring to the water inlet.

Preferably, the device shell includes an upper shell and a lower shell, wherein the lower shell is detachably mounted at the bottom of the upper shell.

Preferably, snap-fitting blocks are arranged on the inner wall of the upper shell, hanging lugs are arranged on the lower shell, and the hanging lugs and the corresponding snap-fitting blocks are movably snap-fitted.

After the solution is adopted, by arranging the filter valve shell in the device shell and mounting the filter element and the switching valve element in the filter valve shell, water flow can be filtered, and then filtered water is sprayed from the handheld shower head and/or the overhead shower head for a user to take a shower, so that the shower head and receptacle combination device is provided with the independent filter device, and has the advantage of being good in filtering effect; the filter valve shell and the overhead shower head are both mounted in the device shell, so that the shower head and receptacle combination device has the advantages of small size and low cost; and the overhead shower head and the handheld shower head are independent water outlet devices, and are not influenced by the filter element, so that the shower head and receptacle combination device has the advantage of high water outlet pressure.

DETAILED DESCRIPTION OF EMBODIMENTS

In order to further explain the technical solution of the present disclosure, the present disclosure will be described in detail through the following specific embodiments.

In the description of the present disclosure, it should be understood that the orientation or position relationship indicated by the terms "center", "longitudinal", "transverse", "upper", "lower", "front", "rear", "left", "right", "vertical", "horizontal", "top", "bottom", "inner", "outer" and the like is based on the orientation or position relationship shown in the drawings, only for facilitating description of the present disclosure and simplifying the description, rather than indicating or implying that the device or element referred to must have a specific orientation, be constructed and operated in a specific orientation, and thus shall not be construed as a limitation to the present disclosure. In the description of the present disclosure, unless otherwise stated, "plurality of" means two or more.

As shown in FIG. 1 to FIG. 9, a preferred embodiment of a shower head and receptacle combination device with an outlet water filtering function is provided, the shower head and receptacle combination device includes a device shell 1; a filter valve shell 2, mounted in the device shell 1, wherein a filter chamber 21 and a valve element chamber 22 are arranged in the filter valve shell 2, a water inlet 23 extending out of the device shell 1 is formed in the side wall of the filter chamber 21, and a first water outlet 24 and a second water outlet 25 are formed in the side wall of the valve element chamber 22; a filter element 3, cooperatively arranged in the filter chamber 21, wherein the end of the filter element 3 facing the valve element chamber 22 is hermetically connected with the valve element chamber 22, and a first water passing hole 31 communicating with the valve element chamber 22 is formed in the filter element 3; a switching valve element 4, cooperatively arranged in the valve element chamber 22 for opening or closing the first water outlet 24 and the second water outlet 25; a shower head connector 5, fixed to the bottom of the filter valve shell 2, wherein one end of the shower head connector 5 extends out of the device shell 1, and the other end of the shower head connector 5 communicates with the first water outlet 24; an overhead shower head 6, mounted in the device shell 1, wherein one end of the overhead shower head 6 is hermetically connected with the second water outlet 25, and the other end of the overhead shower head 6 is provided with nozzles 61 extending out of the device shell 1; a valve element handle 7, cooperatively arranged outside the device shell 1, wherein one end of the valve element handle 7 penetrates through the device shell 1 and then is connected with the switching valve element 4 so as to control the switching valve element 4; and a handheld shower head 8 and a shower head connecting pipe 9, wherein the handheld shower head 8 is detachably mounted on the device shell 1 and is connected with the shower head connector 5 through the shower head connecting pipe 9.

Figure 1:
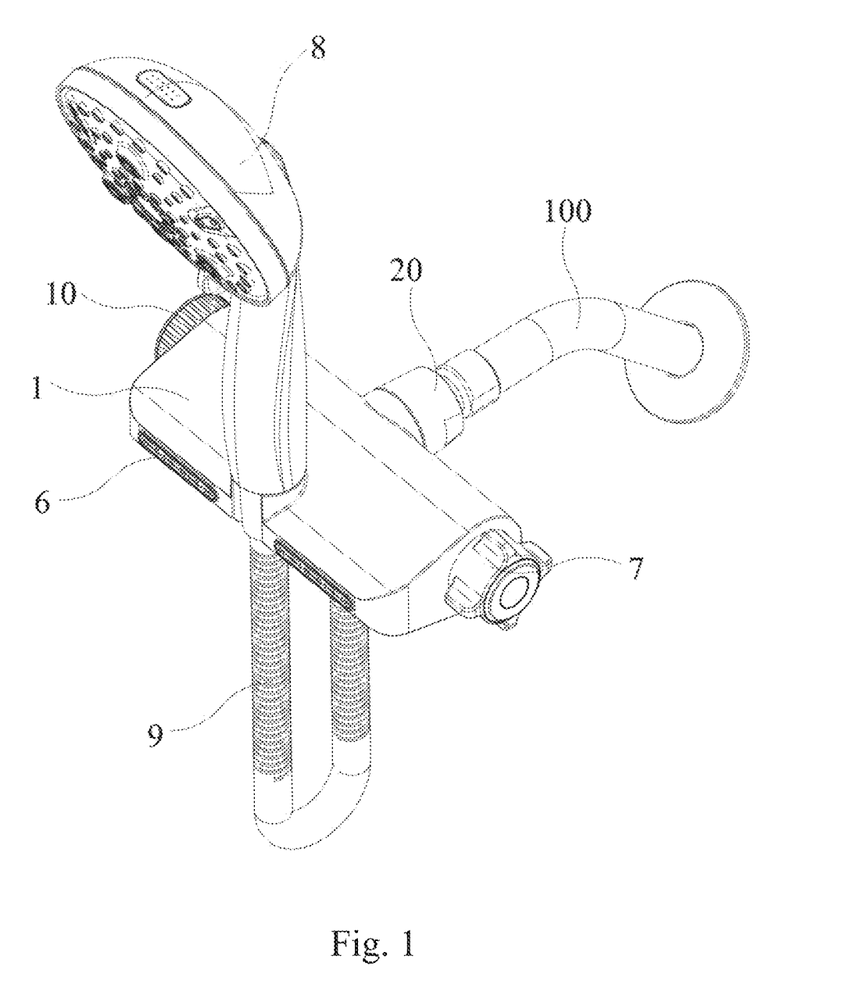
FIG. 1 is a structural schematic diagram of a preferred embodiment of the present disclosure.
Figure 3:
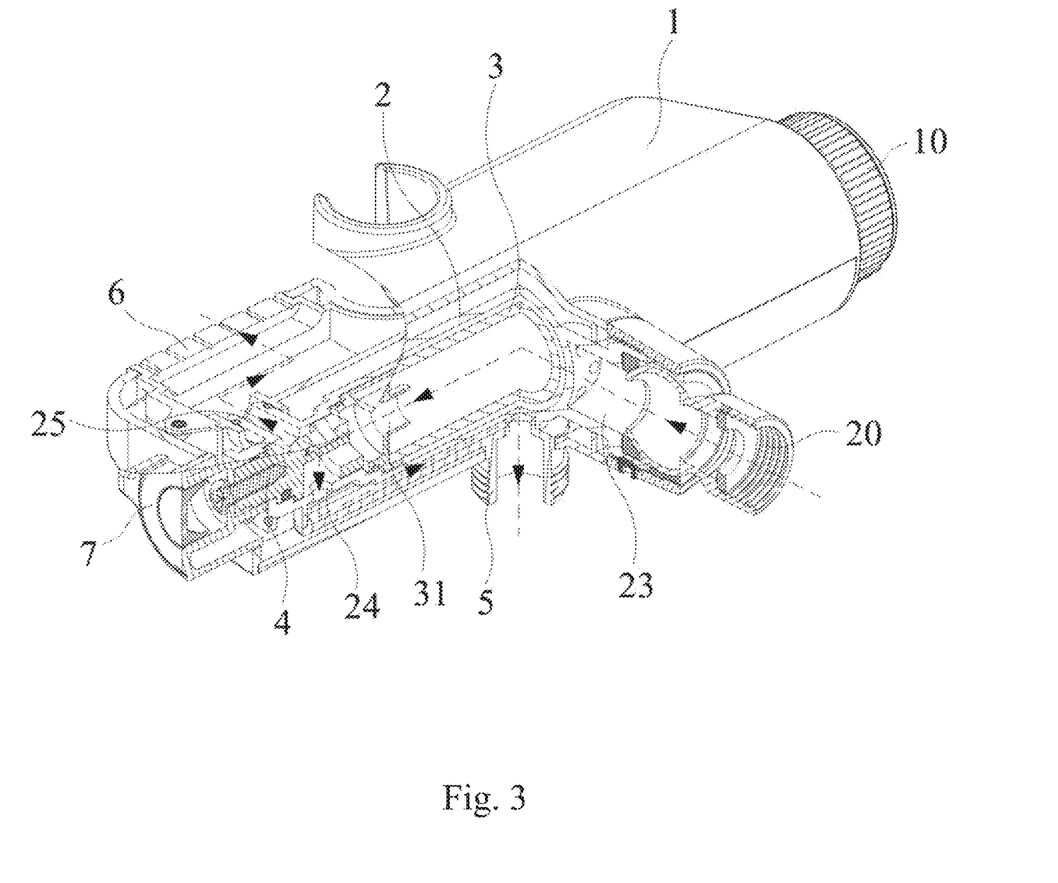
FIG. 3 is a schematic diagram of the flow direction of a water route of a preferred embodiment of the present disclosure.

When the shower head and receptacle combination device is used, the shower head and receptacle combination device is mounted on a water outlet pipe connector 100 on the wall of a bathroom through the water inlet 23, and certainly, the water outlet pipe connector 100 is controlled by a shower valve which controls the opening and closing, water amount and water temperature of the water outlet pipe connector 100; usually, a user controls the water outlet pipe connector 100 through the shower valve to convey constant-temperature water to the shower head and receptacle combination device.

Afterwards, the user can rotate the switching valve element 4 through the valve element handle 7 so as to open or close the first water outlet 24 and the second water outlet 25, and the switching valve element 4 enables the shower head and receptacle combination device to have three modes by opening and closing the first water outlet 24 and the second water outlet 25, wherein the first mode is that the switching valve element 4 only opens the first water outlet 24, wherein constant-temperature water sequentially passes through the water inlet 23, the filter chamber 21, the filter element 3, the first water passing hole 31, the valve element chamber 22, the first water outlet 24, the shower head connector 5, the shower head connecting pipe 9 and the handheld shower head 8 and finally is sprayed from the handheld shower head 8, and the user can independently use the handheld shower head 8 to take a shower.

The second mode is that the switching valve element 4 only opens the second water outlet 25, wherein constant-temperature water sequentially passes through the water inlet 23, the filter chamber 21, the filter element 3, the first water passing hole 31, the valve element chamber 22, the second water outlet 25, the overhead shower head 6 and the nozzles 61, and finally is sprayed from the nozzles 61 of the overhead shower head 6, and the user can independently use the overhead shower head 6 to take a shower.

The third mode is that the switching valve element 4 simultaneously opens the first water outlet 24 and the second water outlet 25, wherein constant-temperature water sequentially passes through the water inlet 23, the filter chamber 21, the filter element 3, the first water passing hole 31, the valve element chamber 22, the first water outlet 24 and the second water outlet 25 and flows to the handheld shower head 8 and the overhead shower head 6 through the first water outlet 24 and the second water outlet 25 respectively to be sprayed from the handheld shower head 8 and the nozzles 61 of the overhead shower head 6 respectively, so that the user can use the handheld shower head 8 and the overhead shower head 6 at the same time to take a shower.

The emphasis of the shower head and receptacle combination device lies in that by arranging the filter valve shell 2 in the device shell 1 and mounting the filter element 3 and the switching valve element 4 in the filter valve shell 2, water flow can be filtered, and then filtered water is sprayed from the handheld shower head 8 and/or the overhead shower head 6 for a user to take a shower, so that the shower head and receptacle combination device is provided with the independent filter device, and has the advantage of being good in filtering effect; the filter valve shell 2 and the overhead shower head 6 are both mounted in the device shell 1, so that the shower head and receptacle combination device has the advantages of small size and low cost; and the overhead shower head 6 and the handheld shower head 8 are independent water outlet devices and are not influenced by the filter element 3, so that the shower head and receptacle combination device has the advantage of high water outlet pressure.

The filter element 3 is a composite filter element formed by integrating one or more of a PP cotton filter element, an activated carbon filter element and a VC filter element.

The PP cotton filter element can block and adsorb impurities during filtering; the activated carbon filter element can filter out abnormal color and peculiar smell to improve the water quality; the VC filter element is rich in VC, so that residual chlorine in water can be effectively removed, and the antioxidant capacity of skin can be better improved; a user can select a composite filter element formed by integrating one or more of the PP cotton filter element, the activated carbon filter element and the VC filter element according to own preferences.

Figure 2:
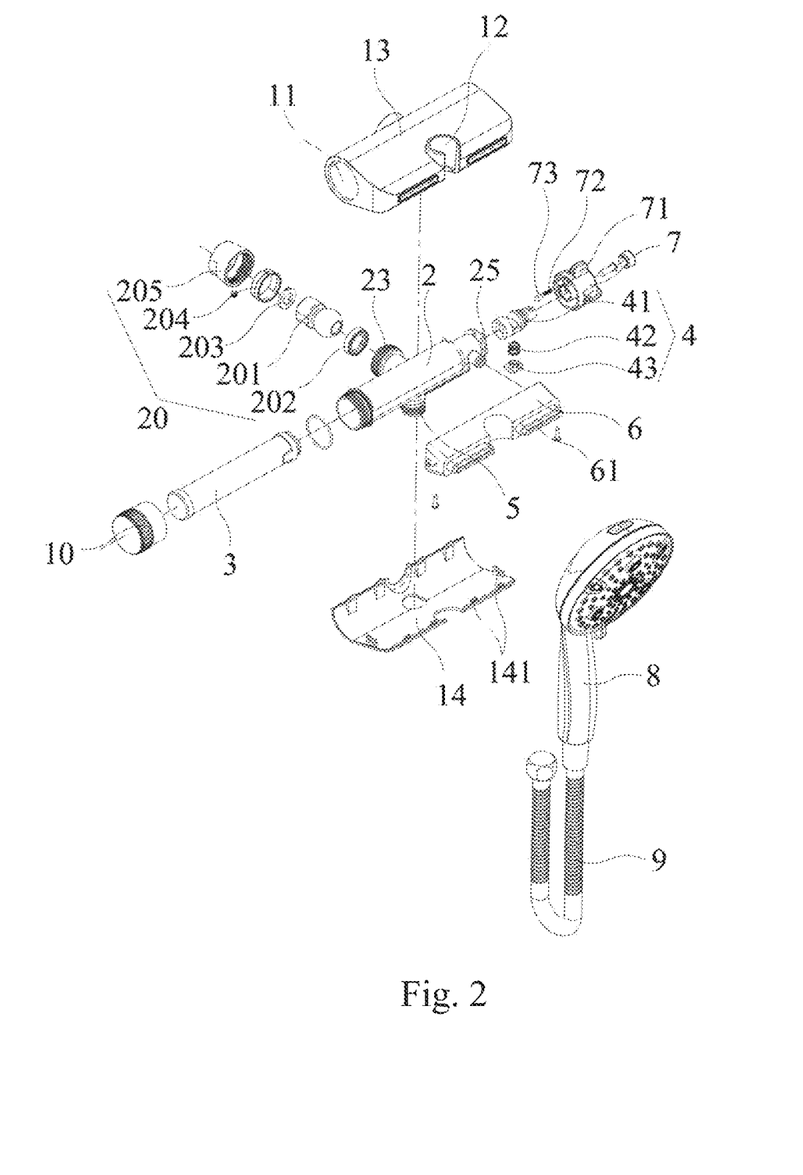
FIG. 2 is an exploded view of a preferred embodiment of the present disclosure.

The shower head and receptacle combination device is further provided with a filter element cover 10, a cover through hole 11 is formed in the side wall of the device shell 1, the filter element 3 passes through the cover through hole 11 and then is detachably mounted in the filter chamber 21, and one end of the filter element cover 10 passes through the cover through hole 11 and then is hermetically screwed on one end of the filter valve shell 2. When the filter element 3 needs to be replaced, only the filter element cover 10 needs to be unscrewed from the filter valve shell 2 from the outside of the device shell; then, the filter element 3 is detached from the filter chamber 21 and replaced with a new filter element 3; and then, the filter element cover 10 is screwed back again. Therefore, the filter element 3 in the shower head and receptacle combination device is convenient to replace, and the shower head and receptacle combination device has the advantage of being convenient to use.

Figure 6:
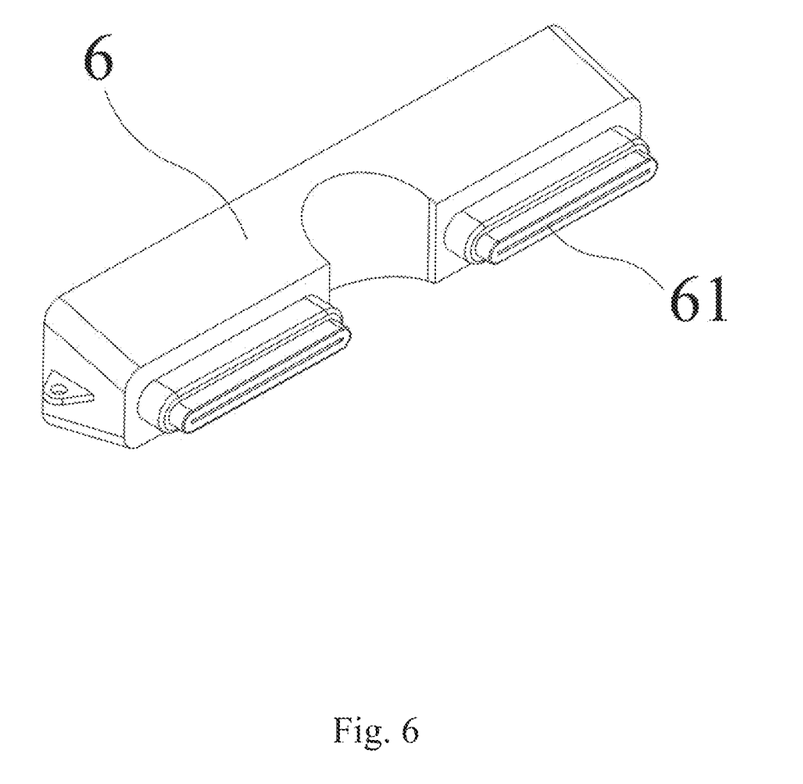
FIG. 6 is a structural schematic diagram of an overhead shower head provided with sheet-shaped water nozzles in a preferred embodiment of the present disclosure.
Figure 7:
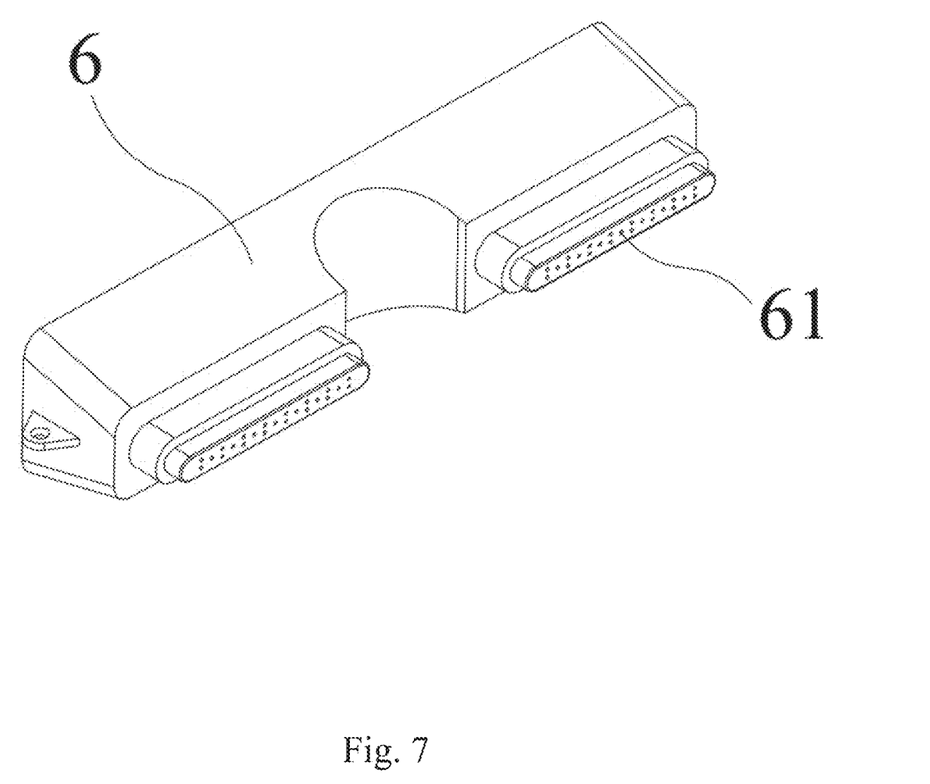
FIG. 7 is a structural schematic diagram of an overhead shower head provided with columnar water nozzles in a preferred embodiment of the present disclosure.
Figure 8:
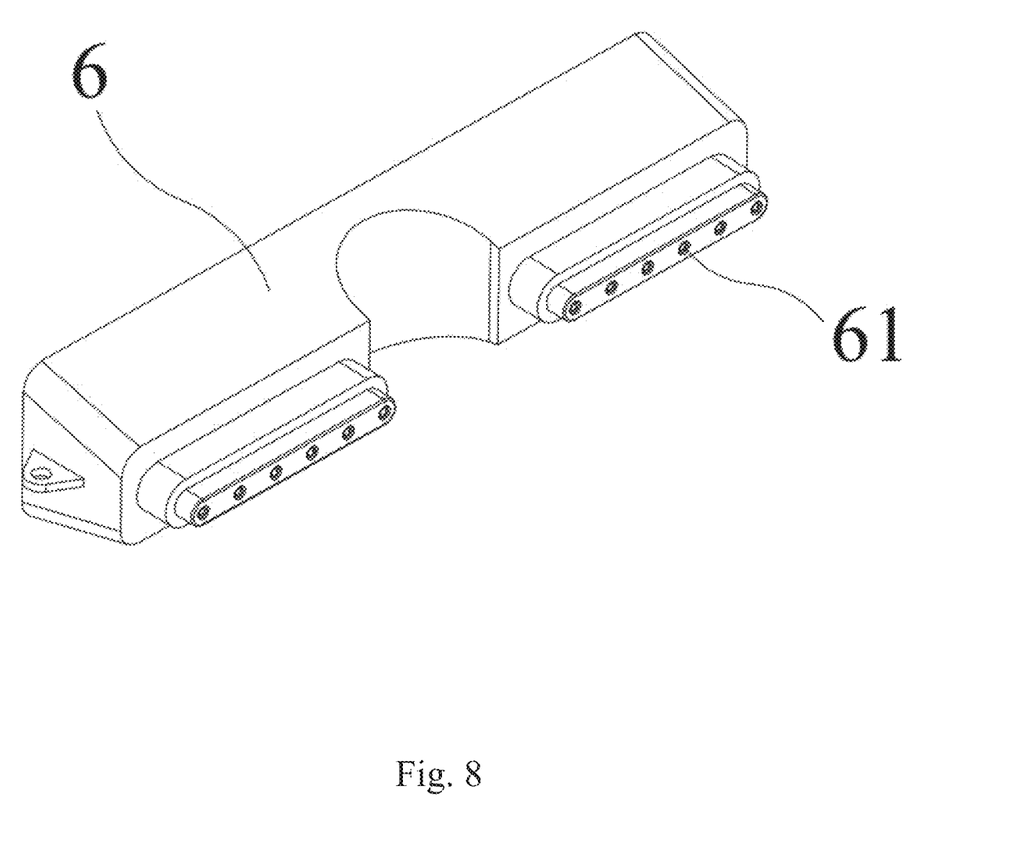
FIG. 8 is a structural schematic diagram of an overhead shower head provided with mist water nozzles in a preferred embodiment of the present disclosure.

The overhead shower head 6 is detachably mounted in the device shell 1, and the nozzles 61 in the overhead shower head 6 are sheet-shaped water nozzles, columnar water nozzles, straight flushing water nozzles, pulse-like water nozzles or mist water nozzles. Therefore, a manufacturer can produce the overhead shower head 6 of various specifications, a user can select to mount the corresponding overhead shower head 6 according to own preferences, and therefore the shower head and receptacle combination device has various use modes and is high in market competitiveness.

Figure 4:
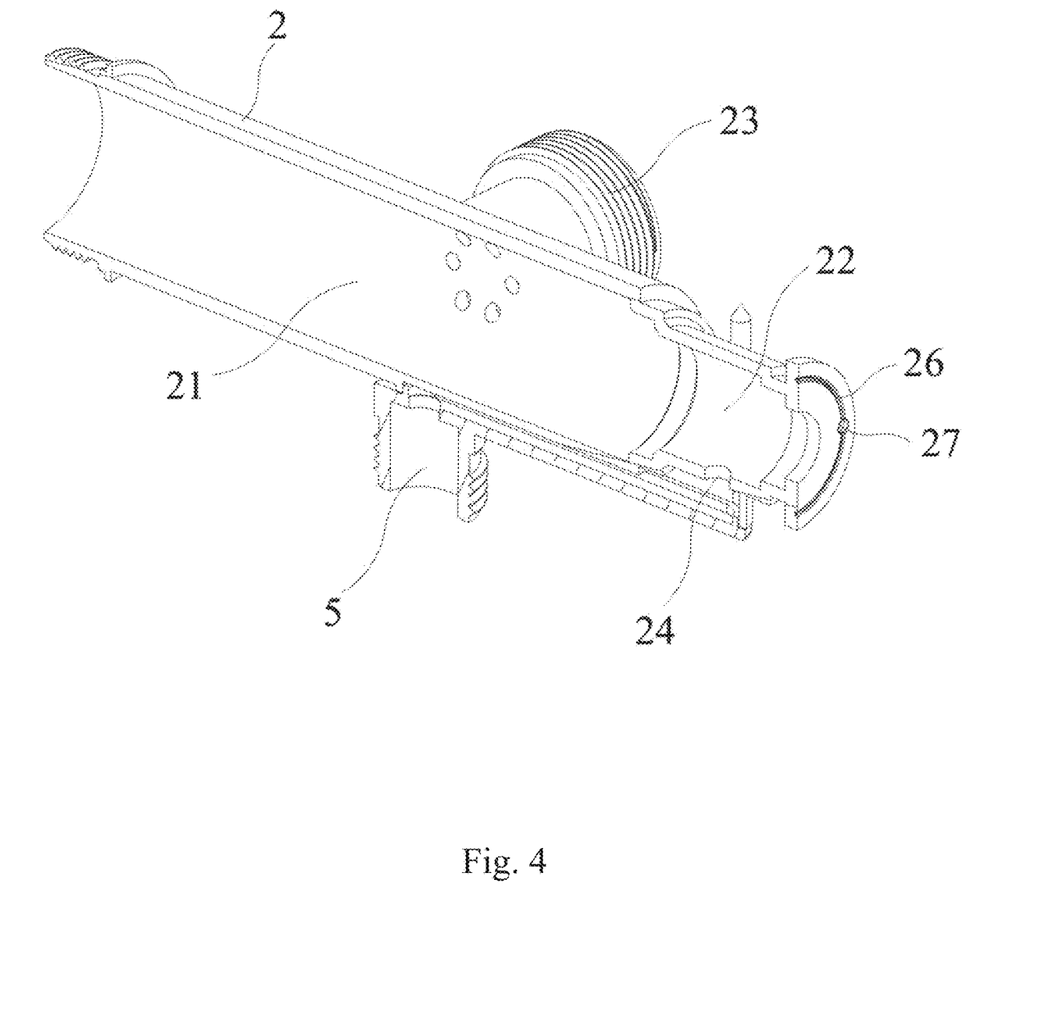
FIG. 4 is a sectional view of a filter valve shell in a preferred embodiment of the present disclosure.

An arc-shaped guide groove 26 is arranged on the end face of the filter valve shell 2 facing the valve element handle 7, and three positioning grooves 27 are arranged on the guide groove 26 at equal intervals; a counterbore 71 is formed in the end of the valve element handle 7 facing the filter valve shell 2, a first spring 72 and a positioning pin 73 are mounted in the counterbore 71, one end of the positioning pin 73 presses the first spring 72 into the counterbore 71, and the other end of the positioning pin 73 abuts against the interior of the guide groove 26; when the valve element handle 7 rotates the switching valve element 4, the positioning pin 73 moves along the guide groove 26 and is movably inserted into one of the positioning grooves 27. In the process of rotating the switching valve element 4 through the valve element handle 7, when the switching valve element 4 only opens the first water outlet 24, when the switching valve element 4 only opens the second water outlet 25, and when the switching valve element 4 simultaneously opens the first water outlet 24 and the second water outlet 25, the positioning pin 73 is inserted into the three positioning grooves 27 respectively, namely, through the cooperation of the first spring 72, the positioning pin 73, the guide groove 26 and the positioning grooves 27, a user can clearly know that he/she has accurately rotated the switching valve element 4 through the valve element handle 7, so that the shower head and receptacle combination device has the advantage of being convenient to use.

Figure 5:
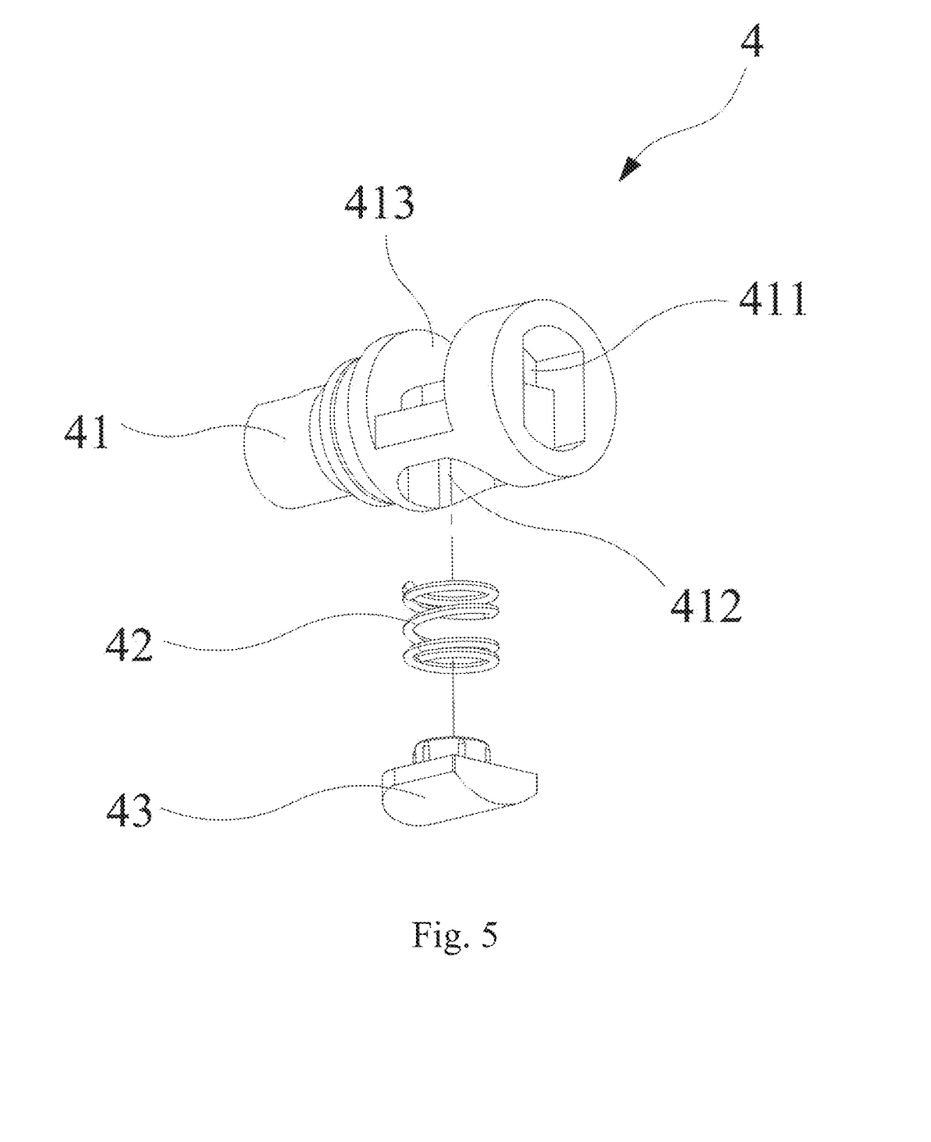
FIG. 5 is an exploded view of a switching valve element in a preferred embodiment of the present disclosure.

The switching valve element 4 includes a valve element body 41, a second spring 42 and a water stop block 43, wherein the valve element body 41 is rotationally and cooperatively arranged in the valve element chamber 22, one end of the valve element body 41 is provided with a second water passing hole 411, the second water passing hole 411 communicates with the first water passing hole 31, the middle of the valve element body 41 is provided with a mounting cavity 412 and a water passing groove 413 communicating with the second water passing hole 411, the other end of the valve element body 41 is connected with the valve element handle 7, one end of the water stop block 43 presses the second spring 42 into the mounting cavity 412, and the other end of the water stop block 43 is in sealed contact with the first water outlet 24 and the second water outlet 25.

When the shower head and receptacle combination device is used, the valve element handle 7 rotates the valve element body 41, the valve element body 41 rotates in the valve element chamber 22, when the water stop block 43 rotates to the first water outlet 24 or the second water outlet 25, the second spring 42 can press the water stop block 43 on the first water outlet 24 or the second water outlet 25 so as to close the first water outlet 24 or the second water outlet 25, water flow can flow through the second water passing hole 411 and the water passing groove 413 from the first water passing hole 31 and flow out of the first water outlet 24 or the second water outlet 25; or when the water stop block 43 rotates to leave the first water outlet 24 and the second water outlet 25, the first water outlet 24 and the second water outlet 25 are both opened, water flow can flow through the second water passing hole 411 and the water passing groove 413 from the first water passing hole 31 and then flow out of the first water outlet 24 and the second water outlet 25, and therefore switching of three water outlet modes of the shower head and receptacle combination device is achieved.

The shower head and receptacle combination device further includes a ball head connecting assembly 20, wherein the ball head connecting assembly 20 includes a ball head nut 201, a sealing gasket 202, a water stop gasket 203, a clamping ring 204 and a locking nut 205, the sealing gasket 202 is cooperatively arranged between the water inlet 23 and the ball head nut 201, the water stop gasket 203 and the clamping ring 204 sleeve the ball head nut 201, the locking nut 205 sleeves the ball head nut 201 and is screwed on the water inlet 23 so as to lock the ball head nut 201, the sealing gasket 202, the water stop gasket 203 and the clamping ring 204 to the water inlet 23. When the shower head and receptacle combination device is used, the shower head and receptacle combination device can be mounted on the water outlet pipe connector 100 on the wall of a bathroom through the ball head nut 201, and the angle of the shower head and receptacle combination device can be adjusted by rotating the arranged ball head connecting assembly 20 so that the shower head and receptacle combination device can be suitable for being used by users of different heights.

The device shell 1 is provided with a shower head containing groove 12, and the handheld shower head 8 is contained in the shower head containing groove 12. Therefore, the handheld shower head 8 is convenient to hold, and a holder does not need to be additionally arranged for the handheld shower head 8.

Figure 9:
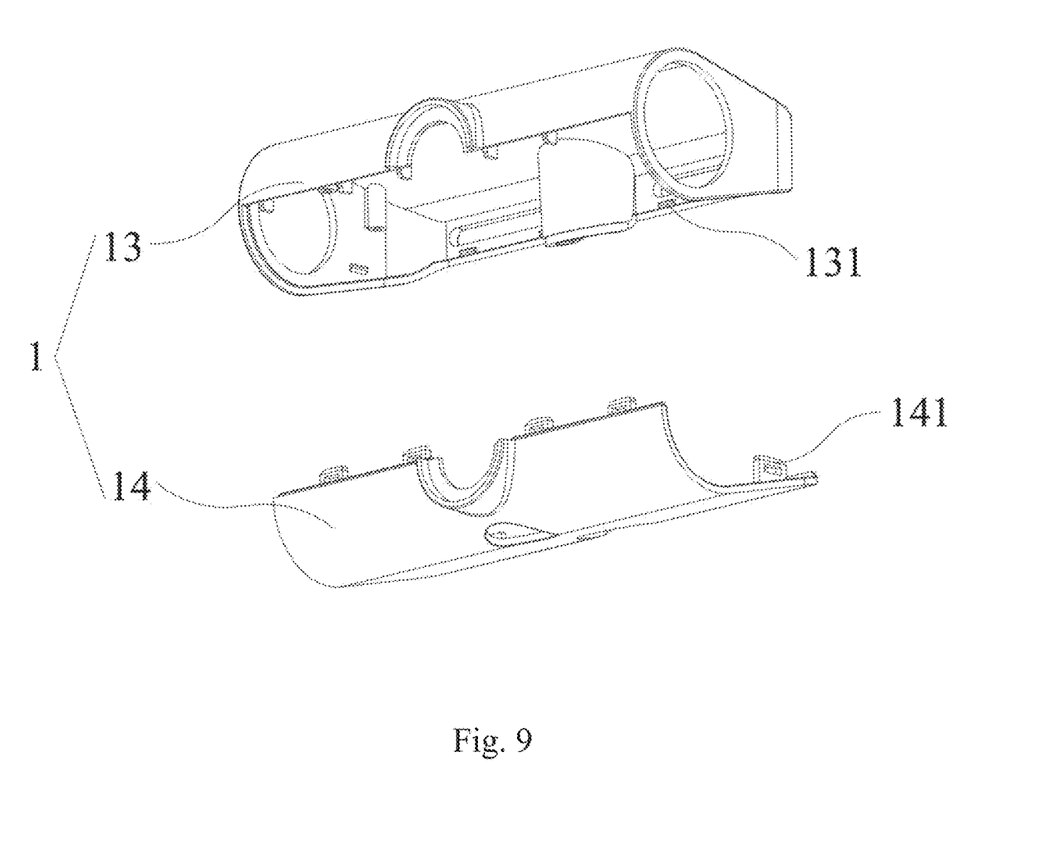
FIG. 9 is an exploded view of a device shell in a preferred embodiment of the present disclosure.

The device shell 1 includes an upper shell 13 and a lower shell 14, wherein the lower shell 14 is detachably mounted at the bottom of the upper shell 13. Specifically, snap-fitting blocks 131 are arranged on the inner wall of the upper shell 13, hanging lugs 141 are arranged on the lower shell 14, and the hanging lugs 141 and the corresponding snap-fitting blocks 131 are movably snap-fitted. Therefore, the lower shell 14 can be locked and fixed to the upper shell 13 without screws, so that the shower head and receptacle combination device has the advantage of being convenient to disassemble and assemble.

The above description of the specific exemplary embodiments of the present disclosure is for the purpose of illustrating and exemplifying and is not intended to limit the present disclosure to the disclosed precise form, and obviously, many changes and variations can be made to the present disclosure according to the above teachings. The objective of selecting and describing the exemplary embodiments is to explain the specific principle and practical application of the present disclosure, so that those of ordinary skill in the art can realize and utilize various different exemplary embodiments and various different selections and changes of the present disclosure. Any appropriate changes or modifications made by those of ordinary skill in the art should be regarded as not departing from the patent category of the present disclosure.

What is claimed is:

1. A shower head and receptacle combination device with an outlet water filtering function, wherein the shower head and receptacle combination device comprises:
   a device shell;
   a filter valve shell, mounted in the device shell, wherein a filter chamber and a valve element chamber are arranged in the filter valve shell, a water inlet extending out of the device shell is formed in a side wall of the filter chamber, and a first water outlet and a second water outlet are formed in a side wall of the valve element chamber;
   a filter element, cooperatively arranged in the filter chamber, wherein an end of the filter element facing the valve element chamber is hermetically connected with the valve element chamber, and a first water passing hole communicating with the valve element chamber is formed in the filter element;
   a switching valve element, cooperatively arranged in the valve element chamber for opening or closing the first water outlet and the second water outlet;
   a shower head connector, fixed to a bottom of the filter valve shell, wherein one end of the shower head connector extends out of the device shell, and an other end of the shower head connector communicates with the first water outlet;
   an overhead shower head, mounted in the device shell, wherein one end of the overhead shower head is hermetically connected with the second water outlet, and nozzles extending out of the device shell are arranged at an other end of the overhead shower head;
   a valve element handle, cooperatively arranged outside the device shell, wherein one end of the valve element handle penetrates through the device shell and then is connected with the switching valve element so as to control the switching valve element; and
   a handheld shower head and a shower head connecting pipe, wherein the device shell is provided with a shower head containing groove, and the handheld shower head is contained in the shower head containing groove and is connected with the shower head connector through the shower head connecting pipe; and
   wherein the shower head and receptacle combination device is further provided with a filter element cover, a cover through hole is formed in a side wall of the device shell, the filter element is configured to pass through the cover through hole and then is detachably mounted in the filter chamber, and one end of the filter element cover is configured to pass through the cover through hole and then is hermetically screwed on one end of the filter valve shell.

2. The shower head and receptacle combination device according to claim 1, wherein the filter element is a composite filter element formed by integrating one or more of a PP cotton filter element, an activated carbon filter element and a VC filter element.

3. The shower head and receptacle combination device according to claim 1, wherein the overhead shower head is detachably mounted in the device shell, and the nozzles in the overhead shower head are sheet-shaped water nozzles, columnar water nozzles, straight flushing water nozzles, pulsating water nozzles or mist water nozzles.

4. A shower head and receptacle combination device with an outlet water filtering function, wherein the shower head and receptacle combination device comprises:
a device shell;
a filter valve shell, mounted in the device shell, wherein a filter chamber and a valve element chamber are arranged in the filter valve shell, a water inlet extending out of the device shell is formed in a side wall of the filter chamber, and a first water outlet and a second water outlet are formed in a side wall of the valve element chamber;
a filter element, cooperatively arranged in the filter chamber, wherein an end of the filter element facing the valve element chamber is hermetically connected with the valve element chamber, and a first water passing hole communicating with the valve element chamber is formed in the filter element;
a switching valve element, cooperatively arranged in the valve element chamber for opening or closing the first water outlet and the second water outlet;
a shower head connector, fixed to a bottom of the filter valve shell, wherein one end of the shower head connector extends out of the device shell, and an other end of the shower head connector communicates with the first water outlet;
an overhead shower head, mounted in the device shell, wherein one end of the overhead shower head is hermetically connected with the second water outlet, and nozzles extending out of the device shell are arranged at an other end of the overhead shower head;
a valve element handle, cooperatively arranged outside the device shell, wherein one end of the valve element handle penetrates through the device shell and then is connected with the switching valve element so as to control the switching valve element;
a handheld shower head and a shower head connecting pipe, wherein the device shell is provided with a shower head containing groove, and the handheld shower head is contained in the shower head containing groove and is connected with the shower head connector through the shower head connecting pipe; and
wherein an arc-shaped guide groove is formed in an end face of the filter valve shell facing the valve element handle, and a positioning groove is arranged on the guide groove; a counterbore is formed in an end of the valve element handle facing the filter valve shell, a first spring and a positioning pin are mounted in the counterbore, one end of the positioning pin presses the first spring into the counterbore, and an other end of the positioning pin abuts against an interior of the guide groove;
when the valve element handle rotates the switching valve element, the positioning pin moves along the guide groove and is movably inserted into the positioning groove.

5. A shower head and receptacle combination device with an outlet water filtering function, wherein the shower head and receptacle combination device comprises:
a device shell;

a filter valve shell, mounted in the device shell, wherein a filter chamber and a valve element chamber are arranged in the filter valve shell, a water inlet extending out of the device shell is formed in a side wall of the filter chamber, and a first water outlet and a second water outlet are formed in a side wall of the valve element chamber;
a filter element, cooperatively arranged in the filter chamber, wherein an end of the filter element facing the valve element chamber is hermetically connected with the valve element chamber, and a first water passing hole communicating with the valve element chamber is formed in the filter element;
a switching valve element, cooperatively arranged in the valve element chamber for opening or closing the first water outlet and the second water outlet;
a shower head connector, fixed to a bottom of the filter valve shell, wherein one end of the shower head connector extends out of the device shell, and an other end of the shower head connector communicates with the first water outlet;
an overhead shower head, mounted in the device shell, wherein one end of the overhead shower head is hermetically connected with the second water outlet, and nozzles extending out of the device shell are arranged at an other end of the overhead shower head;
a valve element handle, cooperatively arranged outside the device shell, wherein one end of the valve element handle penetrates through the device shell and then is connected with the switching valve element so as to control the switching valve element;
a handheld shower head and a shower head connecting pipe, wherein the device shell is provided with a shower head containing groove, and the handheld shower head is contained in the shower head containing groove and is connected with the shower head connector through the shower head connecting pipe; and
wherein the switching valve element comprises:
a valve element body, rotationally and cooperatively arranged in the valve element chamber, one end of the valve element body is provided with a second water passing hole, the second water passing hole communicates with the first water passing hole, a middle of the valve element body is provided with a mounting cavity and a water passing groove communicating with the second water passing hole, and an other end of the valve element body is connected with the valve element handle; and
a second spring and a water stop block, wherein one end of the water stop block presses the second spring into the mounting cavity, and an other end of the water stop block is in sealed contact with the first water outlet and the second water outlet.

6. The shower head and receptacle combination device according to claim 1, wherein the shower head and receptacle combination device further comprises a ball head connecting assembly, wherein the ball head connecting assembly comprises a ball head nut, a sealing gasket, a water stop gasket, a clamping ring and a locking nut, the sealing gasket is cooperatively arranged between the water inlet and the ball head nut, the water stop gasket and the clamping ring sleeve the ball head nut, the locking nut sleeves the ball head nut and is screwed on the water inlet so as to lock the ball head nut, the sealing gasket, and the clamping ring to the water inlet.

7. The shower head and receptacle combination device according to claim 1, wherein the device shell comprises an upper shell and a lower shell, wherein the lower shell is detachably mounted at a bottom of the upper shell.

8. The shower head and receptacle combination device according to claim 7, wherein a snap-fitting block is arranged on an inner wall of the upper shell, a hanging lug is arranged on the lower shell, and the hanging lug and the snap-fitting block are movably snap-fitted.

\* \* \* \* \*